US010372986B2

(12) United States Patent
Barikmo et al.

(10) Patent No.: US 10,372,986 B2
(45) Date of Patent: Aug. 6, 2019

(54) METHOD AND DEVICE FOR DETECTING AN OVERHEAD CABLE FROM AN AERIAL VESSEL (71) Applicant: Kleon Prosjekt AS, Kongsberg (NO)

(72) Inventors: Aasmund Barikmo, Oslo (NO); Arne Sommerfelt, Oslo (NO)

(73) Assignee: Kleon Prosjekt AS, Kongsberg (NO)

( * ) Notice: Subject to any disclaimer, the term of this patent is extended or adjusted under 35 U.S.C. 154(b) by 0 days.

(21) Appl. No.: 15/537,971

(22) PCT Filed: Dec. 22, 2015

(86) PCT No.: PCT/IB2015/059875
§ 371 (c)(1),
(2) Date: Jun. 20, 2017

(87) PCT Pub. No.: WO2016/103173
PCT Pub. Date: Jun. 30, 2016

(65) Prior Publication Data
US 2018/0039834 A1 Feb. 8, 2018

(30) Foreign Application Priority Data

Dec. 22, 2014 (NO) .................................. 20141554

(51) Int. Cl.
G06K 9/00 (2006.01)
G06T 7/73 (2017.01)
(Continued)

(52) U.S. Cl.
CPC ....... *G06K 9/00637* (2013.01); *G06K 9/4652* (2013.01); *G06K 9/6202* (2013.01);
(Continued)

(58) Field of Classification Search
CPC combination set(s) only.
See application file for complete search history.

(56) References Cited

U.S. PATENT DOCUMENTS 4,405,926 A * 9/1983 Potter .................... G01V 3/165
342/455
6,678,394 B1 * 1/2004 Nichani ............... G05D 1/0251
348/169
(Continued)

FOREIGN PATENT DOCUMENTS

EP 1908010 B1 12/2013

OTHER PUBLICATIONS

Le et al "Knowledge-based Power Line Detection for UAV Surveillance and Inspection Systems" IEEE 2008.*
(Continued)

*Primary Examiner* — Tsung Yin Tsai
(74) *Attorney, Agent, or Firm* — Osha Liang LLP (57) ABSTRACT A method and device for detecting an overhead cable from an aerial vessel, for instance from a helicopter in motion, and specifically for use in a landing preparing procedure. The method includes providing, from a camera arranged in the aerial vessel, a plurality of images of an area beneath the aerial vessel when the aerial vessel is in motion; detecting lines in the images; determining if the lines represent lines at ground level or lines at a level above ground level; and determining if a line at a level above ground level represents a possible overhead cable. The step of detecting lines in the images may include a modified SUSAN algorithm. The step of determining if the lines represent lines at ground level or lines above ground level may include parallax calculation.

11 Claims, 6 Drawing Sheets (51) Int. Cl.
*G06K 9/46* (2006.01)
*G06K 9/62* (2006.01)
*G08B 21/18* (2006.01)

(52) U.S. Cl.
CPC ............. *G06T 7/73* (2017.01); *G08B 21/18* (2013.01); *G06T 2207/10016* (2013.01); *G06T 2207/10024* (2013.01); *G06T 2207/10032* (2013.01); *G06T 2207/30184* (2013.01)

(56) References Cited

U.S. PATENT DOCUMENTS

| | | | | |
|---|---|---|---|---|
| 7,286,912 | B2* | 10/2007 | Rubin | G01C 23/00 324/457 |
| 8,301,326 | B2* | 10/2012 | Malecki | G05D 1/0676 701/24 |
| 8,373,590 | B1 | 2/2013 | Pire | |
| 9,964,658 | B2* | 5/2018 | Hull | G01V 3/08 |
| 2007/0019838 | A1* | 1/2007 | Yelton | G06T 7/12 382/103 |
| 2007/0086657 | A1 | 4/2007 | Harder et al. | |
| 2010/0214152 | A1* | 8/2010 | Huang | G01S 7/025 342/29 |
| 2010/0268458 | A1* | 10/2010 | Becker | G01C 23/00 701/532 |
| 2011/0225212 | A1* | 9/2011 | Pire | G08G 5/0086 707/812 |
| 2013/0120164 | A1* | 5/2013 | Greene | G08G 5/0086 340/946 |
| 2015/0221079 | A1* | 8/2015 | Schultz | G06T 7/0004 382/190 |
| 2015/0248584 | A1* | 9/2015 | Greveson | G06K 9/00476 382/113 |

OTHER PUBLICATIONS

International Search Report issued in corresponding application No. PCT/IB2015/059875 dated Apr. 20, 2016 (2 pages).
Written Opinion of the International Searching Authority issued in corresponding application No. PCT/IB2015/059875 dated Apr. 20, 2016 (7 pages).
Norwegian Search Report issued in corresponding application No. 20141554 dated Jul. 14, 2015 (2 pages).
Campoy et al., "Computer Vision Onboard UAVs for Civilian Tasks"; Journal of Intelligent and Robotic Systems; Theory and Applications—(Incorporating Mechatronic Systems Engineering); vol. 54, No. 1-3, pp. 105-135; published Aug. 7, 2008 (31 pages).
Tippetts et al., "FPGA Implementation of a Feature Detection and Tracking Algorithm for Real-time Applications"; Advances in Visual Computing; pp. 682-691; Nov. 26, 2007 (10 pages).
Smith et al., "SUSAN—A New Approach to Low Level Image Processing"; International Journal of Computer Vision; XP-002578087; vol. 23, No. 1, pp. 45-78; Jan. 1, 1997 (34 pages).
International Preliminary Report on Patentability issued in corresponding application No. PCT/IB2015/059875 dated Mar. 13, 2017 (16 pages).

* cited by examiner

METHOD AND DEVICE FOR DETECTING AN OVERHEAD CABLE FROM AN AERIAL VESSEL

TECHNICAL FIELD

The invention concerns a method and device for detecting an overhead cable from an aerial vessel.

BACKGROUND

From time to time, fatal accidents occur due to an aerial vessel, specifically a helicopter, coming into contact with overhead cables such as power lines and telecommunication cables. Specifically, it is a challenge to avoid such overhead cables during landing of the aerial vessel in terrain unfamiliar to the pilot.

Often, overhead cables have such small dimensions (small width) that they are difficult to observe with the naked eye.

Traditionally, helicopter crews have avoided overhead cables by using maps in which known overhead cables are drawn in.

Consequently, within the field, there exists a general need for methods and devices to detect overhead cables from an aerial vessel.

Previously, overhead cables have been detected from an aerial vessel, based on use of a camera and image processing techniques processing the image shut by the camera.

For example, EP-1 908 010 shows a system and a method for passive detection of cables from a helicopter. A digital image is captured from the helicopter. Firstly, the digital image is pre-processed to reduce noise which does not resemble cables. Then pixels are identified which may be classified as cables using a segment-finder module. Further, the identified pixels are linked in a linker module, to determine if a cable-like structure is present. This generates a cable overlay. The linker module comprises spatial and temporal filters. The spatial filter eliminates features in the image which are not consistent with cables, while the temporal filter eliminates pixels which do not fulfill a minimal image-to-image persistence. When a cable is detected the pilot is warned.

In such warning systems it is desirable to improve the safety to insure that warning is given when an overhead cable is actually present. At the same time, it is desirable to avoid a warning when an overhead cable is not present.

One or more embodiments of the invention provide an improved method and device for detecting overhead cables from an aerial vessel.

SUMMARY

According to one or more embodiments of the invention, it is provided a method and device for detecting an overhead cable from an aerial vessel, as set forth in the patent claims.

According to one or more embodiments of the invention, compared to the prior art, a reduction in the risk of objects imaged as a line in the image captured by the camera being incorrectly detected as an overhead cable is provided, if the object in reality is present at ground level. This may be the case if the object is a roadside, sidewalk edge, a cable or hose lying on the ground, etc.

Thus, one or more embodiments of the invention involve a clear improvement compared to the prior art, and constitutes an advantageous safety tool, specifically for application in landing aerial vessels.

BRIEF DESCRIPTION OF THE DRAWINGS

The invention will be described in more detail, using the exemplary emodiments, and with reference to the drawings.

DETAILED DESCRIPTION

Figure 1:
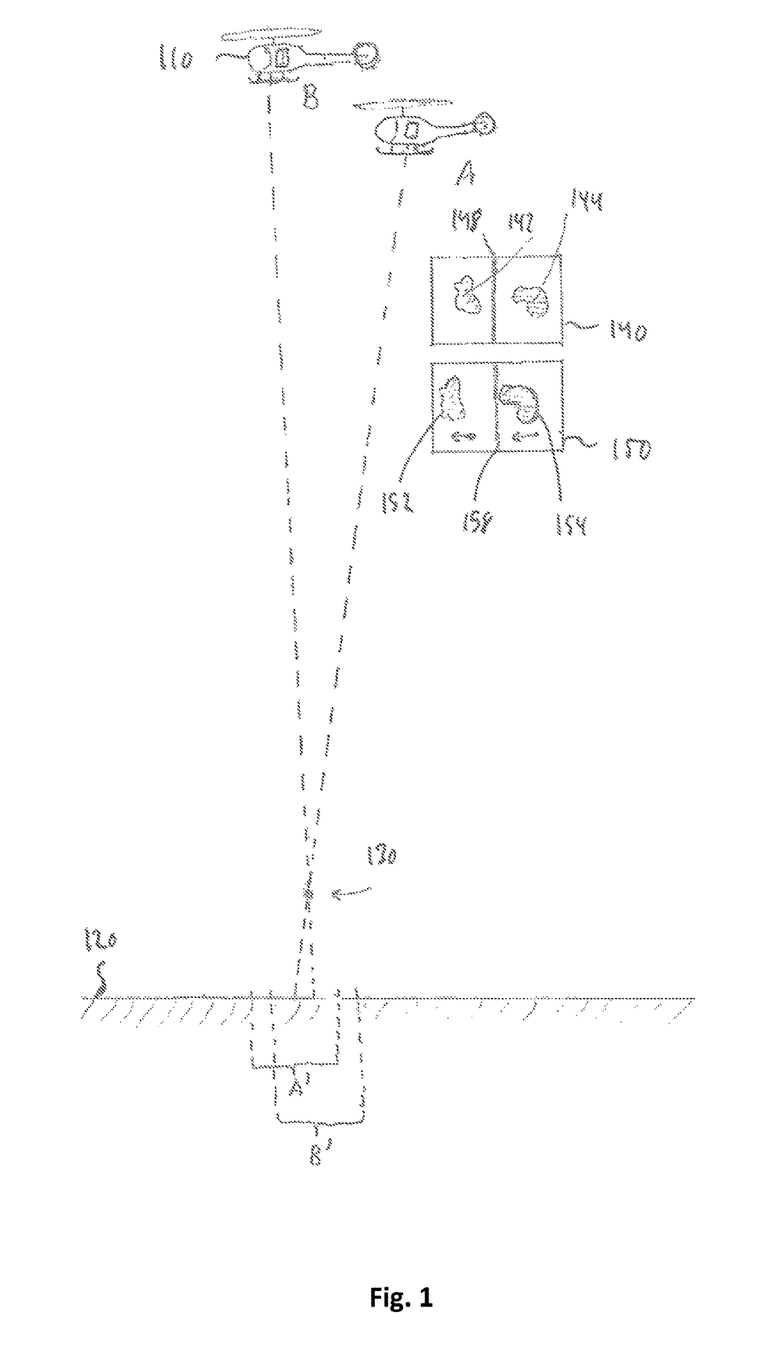
FIG. 1 is a schematic figure illustrating principles of a method and device for detection of an areal cable from an aerial vessel.

FIG. 1 is a schematic figure illustrating principles of a method and device for detecting an overhead cable from an aerial vessel.

Regarding this invention, an overhead cable is to be understood as cables, wires and lines suspended above ground level, e.g., between posts or other fixed structures. Thus, overhead cables may also comprise power lines, communication lines, and aerial contact wires for trains or trams, and also any similar type of slim, extended objects suspended above ground level.

FIG. 1 illustrates an aerial vessel in the form of a helicopter 110, which is moving, at a certain height above the ground 120. A first position A and a second position B are specified for the helicopter 110. Positions A and B are associated with respective first and second points in time. Consequently, the helicopter 110 is in movement between positions A and B during the period the method of detecting an overhead cable is performed.

A camera is arranged in the helicopter 110. Advantageously, the camera is arranged such that its field of view is directed substantially perpendicular to the ground.

A suspended overhead cable, more specifically its cross section, is shown in 130. The cable is positioned substantially above ground level 120, e.g., at an altitude in the order of 2-40 meters above ground level, more specifically 3-20 meters above ground level.

When the pilot is about to land the helicopter 110 in an area on the ground 120, it is vital to avoid collision with any overhead cable, such as the suspended overhead cable 130.

Certain objects on ground level, such as e.g. a roadside, sidewalk edge, a wire or hose resting directly on the ground, would appear as a line in both the view of the pilot and in an image shot by the camera. The suspended overhead cable 130 will also appear as a line both in the pilot's field of view and in an image shot by the camera.

To distinguish between such objects at ground level and an overhead cable, in accordance with one or more embodiments of the invention, using the camera, a plurality of images of the area below the helicopter is shot, during flight of the helicopter. In FIG. 1, it is illustrated that two images are taken. A first image 140, taken at the first point in time, wherein the helicopter is in position A, represents a first area A' on the ground, A second image 150, taken at the second point in time, wherein the helicopter is in position B, represents a second area B' on the ground.

According to one or more embodiments of the invention, lines are detected in both images. A line 148 is illustrated in the first image 140, and a line 158 is illustrated in the second image 150.

Further, it is determined whether the detected lines 148, 158 represent lines at ground level or lines at a level above ground level.

This determination may be performed with parallax calculation. In this case, pairs of lines 148, 158 belonging together are identified in the first image and the second image, respectively. Further, a background is identified in each of the first and second images, associated with the pairs of lines. Such a background is illustrated by the areas 142, 144 in the first image 140, and by areas 152, 154 in the second image 150. Moreover, it is determined if a line and its associated background are shifted more than a predetermined limit from the first image 140 to the second image 150. If this is the case, it is determined that the line represents a line at a level above ground level, i.e., it represents a possible overhead cable.

In FIG. 1, it is to be understood that the line 158 in the second image 150 has shifted significantly to the right I relation to its associated background 152, 154, compared to the line 148 in relation to its associated background 142, 144 in the first image 140.

Consequently, it may be established that the lines 148, 158 represent a possible overhead cable. Then, according to the method, a warning may be issued. This makes the pilots able to take safety precautions, such as aborting the landing procedure.

Had the detected lines in the first and second images in stead been caused by an object at ground level, such as e.g. a sidewalk edge, such a shift would not have appeared, and the method would not result in detection of possible overhead cable.

An exemplary threshold value for detection of significant parallel shift may be calculated in accordance with the following: The height above ground level of the overhead cable is designated h, and the altitude of the helicopter is designated H. The shift of the complete image, due to substantial horizontal transfer of the helicopter, is designated q. The parallax of the overhead cable towards the ground is then given as: $p=hq/(H-h)$. The altitude of the overhead cable may be set at a minimum, e.g., h=2 meters. The altitude H of the helicopter may either be provided by the pilot or retrieved from other instruments, including GPS data, in which both the altitude of the helicopter above sea level and the altitude of the ground level is taken into consideration. Worth noting here is that the parallax rises when the helicopter descends; thus, it is safer to specify a too large H. The value of q for the shift of the image may be estimated from the two actual images using an image processing technique, e.g., known as motion detection. As a calculation example. It has been found that the parallax may correspond to 6 pixels using a 1000×1000 pixel camera from an altitude H=200 meters when the image section is shifted 20% between the first and second images.

Figure 2:
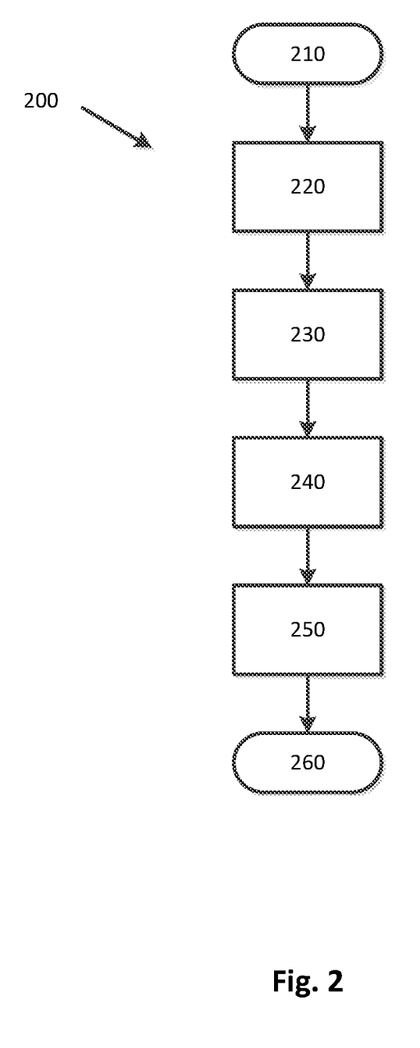
FIG. 2 is a schematic flow chart illustrating a method of detecting an overhead cable from an aerial vessel.

FIG. 2 is a schematic flow chart illustrating a method 200 for detecting an overhead cable from an aerial vessel.

The method 200 may advantageously be performed with a processing device, such as a micro processor or a micro controller, which may be included into a device for detecting an overhead cable from an aerial vessel. Such a device may in addition to the processing device comprise a camera. The processing device and the device for detecting an overhead cable from an aerial vessel are more closely described with reference to FIG. 3 below.

The method 200 is started by initial step 210.

Firstly, a step 220 is performed to provide a plurality of images of an area below the aerial vessel. The images are provided from a camera arranged in the aerial vessel, during movement of the aerial vessel.

Specifically advantageous the step 220 comprises providing, from the camera, a first and second image at a first and second point in time, respectively, as the aerial vessel s in motion between the first and second points in time.

When the images are retrieved from the camera, a line detection step 230 is performed, in which lines in the provided images are detected.

Specifically advantageous, step 230 of detecting lines in the images comprises a modified SUSAN algorithm.

SUSAN (Smallest Univalue Segment Assimilating Nucleus) is a known principle within the field of digital image processing, for detection or extraction of specific features, especially edges and corners, in an image. The conventional SUSAN principle is e.g. disclosed in S-M. Smith and J. M. Brady: "SUSAN—a new approach to low level image processing", International Journal of Computer Vision archive, Volume 23, Issue 1 May 1997, pp. 45-78).

The procedure described here is novel and is substantially modified compared to the known SUSAN algorithm, to conform to the present area of application, namely detection of an overhead cable from an aerial vessel. However, the described modified SUSAN algorithm may in addition be used in other situations where there is a need to detect lines in a digital image.

In this case, the modified SUSAN algorithm may comprise, for each of the provided images:
  providing a circular adjacent area around a center pixel,
  compare the values of the center pixels with the values of other pixels within the adjacent area,
  define a USAN area comprising the pixels in the adjacent area having values substantially similar to the center pixel,
  determine a geometry for the USAN are, and
  consider a line as detected when the geometry of the USAN area fulfils a predetermined requirement.

Such an application of the method, in which the detection step 230 comprises a modified SUSAN algorithm, may further comprise:
  determine the direction of the USAN area; and
  let the direction of the USAN area decide the direction of the lines.

The direction of the USAN area may bed determined by eigenvalue decomposition.

Further possible properties and features of the line detection step 230, in particular the modified SUSAN algorithm, are apparent below with reference to FIG. 5A and 5B.

Moreover, with reference to FIG. 2, a determining step 240 is performed, in which it is determined if the lines detected in step 230 represent lines at ground level or lines at a level above ground level.

The determining step 240 may comprise parallax calculation. This may for example be achieved by the determining step 240 comprising:
  identifying pair of lines belonging together from the first and second images; identifying a background in each of the first and second images, associated with the pair of lines, and determining if a line and its associated background has shifted more the a predetermined limit from the first to the second image. If this is the case, the determining step 240 will further comprise to decide that the line represents a line at a level above ground level.

Subsequently, step 250 is performed, which decides that a line at a level above ground level represents a possible overhead cable.

In one or more embodiments, the method 200 may further comprise gathering position or motion data for the aerial vessel. In this case, the step of deciding that the line represents a line at a level above ground level may further use the gathered position and motion data.

In one or more embodiments, the images are color images. In this case, the step of detecting lines in the images may comprise assessment of color of pixels in the images. Advantageously, assessment of color may include transformation from a first color space to a second color space. An appropriate transformation would be to move from the unprocessed spectral intensity values red/green/blue (RGB), which is often the format in which cameras provides pixels, to three values of color, saturation, and intensity (HIS), which is suitable in image processing. The assessment of color may advantageously include use of distance measure which emphasizes color differences appearing more often between lines and their background. This may he dynamically conformed to the general background color. For example, over a football field which is a predominantly green background, one may emphasize all pixels which are not green.

The described method 200 may in any disclosed embodiment advantageously be performed during a landing preparing procedure for the aerial vessel, specifically the helicopter.

Suitably, the camera may be arranged in the aerial vessel in such a way that the field of view of the camera is substantially directed perpendicularly towards the ground.

The method 200 may in any described embodiment further comprise to issue a warning when an overhead cable is detected.

Figure 3:
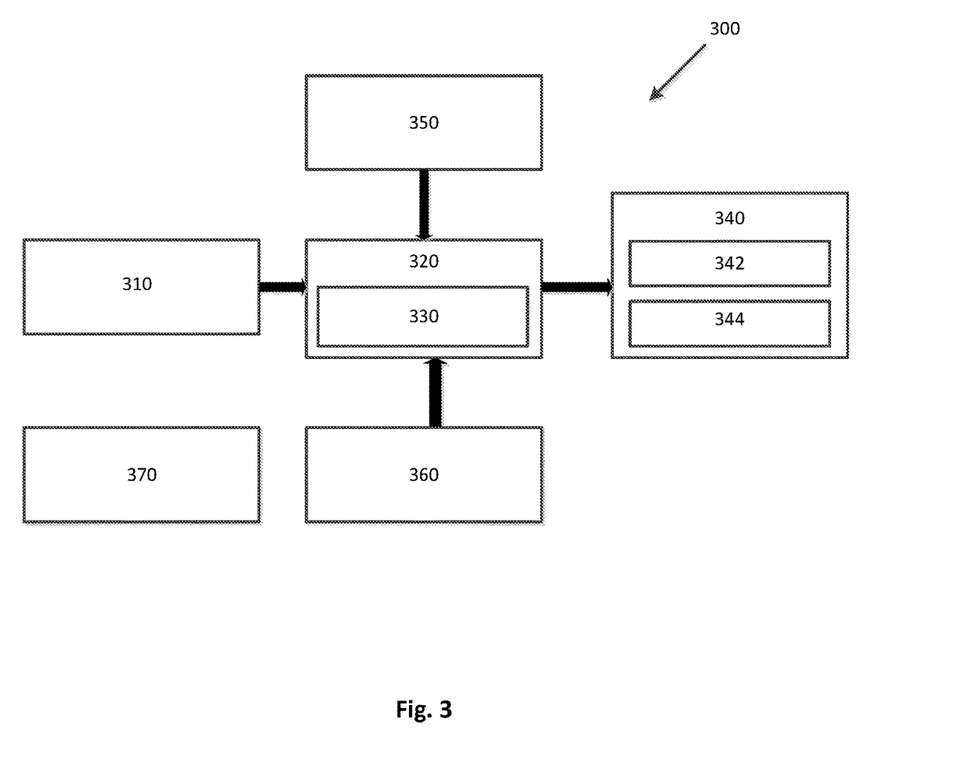
FIG. 3 is a schematic block diagram illustrating a device for detecting an overhead cable from an aerial vessel.

FIG. 3 is a schematic block diagram illustrating a device 300 for detecting an overhead cable from an aerial vessel, e.g. a helicopter 110. In use, the device is arranged in or at the aerial vessel. In a possible aspect, one or more embodiments of the invention may concern an aerial vessel, e.g. a helicopter 110, which comprises such a device 300 for detection of an overhead cable from the aerial vessel.

The device 300 for detecting an overhead cable from an aerial vessel comprises a camera 310. In one or more embodiments, the camera is a digital camera for taking freeze frame color images. The camera 310 may for instance have an image resolution in the order of 1-50 mega pixels, and is equipped with suitable optics, shutter, etc. In one or more embodiments, the camera 310 may be arranged in the helicopter 110 such that its field of view is directed substantially perpendicular towards the ground 120, at least during the spatially regular horizontal orientation of the helicopter 110.

The camera 310 is communicatively connected to a processing device 320, e.g., a computer. The processing device 320 is arranged to control the camera 310, especially to initiate photography, and also retrieve data from the camera 310. The processing device 320 is arranged to perform a method 200 as disclosed in the present specification. This is achievable using a computer program 330, which is stored in a memory connected to the processing unit. The computer program 330 comprises computer functions which causes the processing unit 320 to perform the disclosed method 200.

The processing unit 320 comprises, or is connected to, at least a memory for storing program instructions and data, among other things. The memory may comprise a random access memory (RAM), especially for storing temporary data, ands a non-random access memory, especially for storing program instructions and other fixed data (ROM, Flash, etc.).

Optionally, the processing unit 320 may further be communicatively connected to a warning unit 340, which is arranged to issue a visual warning 342 and/or a sound warning 344, e.g., to the pilot, in the case a possible overhead cable is detected. The visual warning 342 may suitably include indicating a line corresponding to the detected line on a map or an image displayed to the pilot. In the case of an image, the image may be taken by the camera 310 and displayed on a display. In the case of a map, the map may be retrieved from stored map data and presented on a display.

Alternatively, the warning may be a simple visual 342 and/or audio 344 warning, e.g., provided by a control light and/or an audio signal.

Optionally, the processing unit 320 may further be communicatively connected to one or more position data units 350, 360. A position data unit may be a GPS module 350 which provides global position data, and/or accelerometer or position sensor 360 measuring the orientation of the helicopter 110 relatively the perpendicular line and velocity changes.

Optionally, the device 300 may further comprise, or be connected to, at least one illumination source 360, e.g., headlights arranged on the aerial vessel to illuminate an area below the aerial vessel.

Figure 4A:
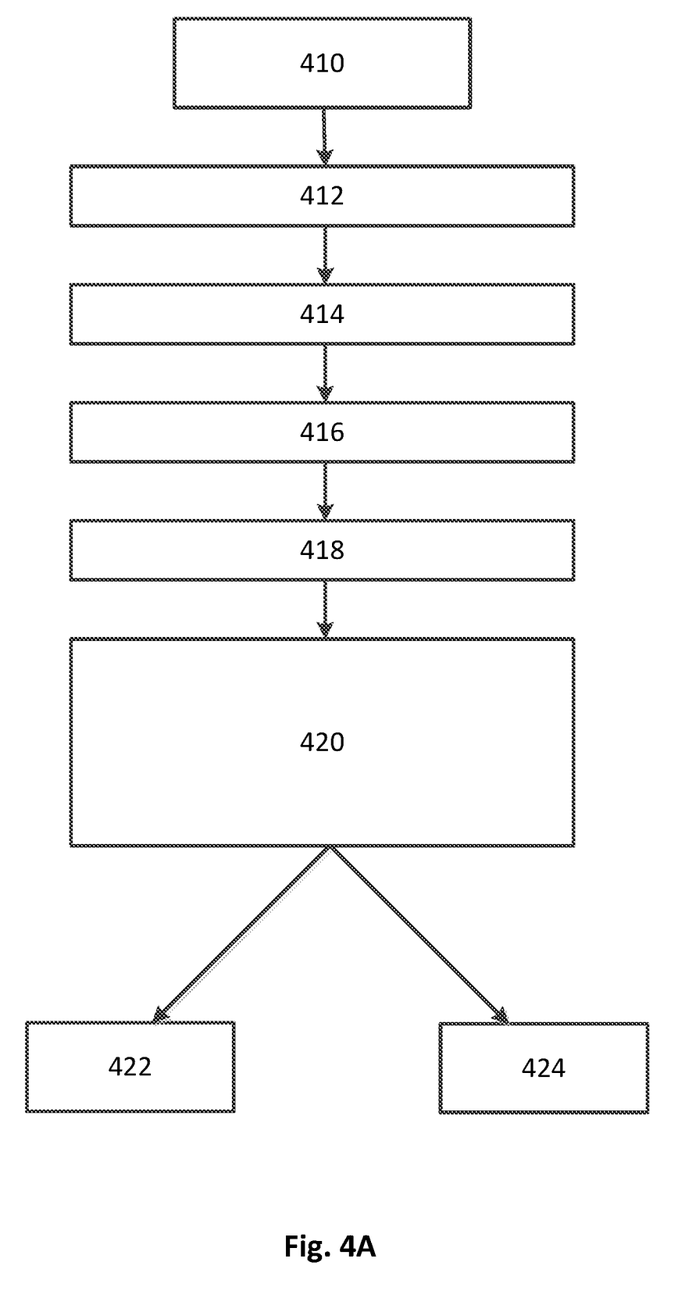
FIGS. 4A and 4B are schematic flow charts illustrating details of a line detection step.
Figure 4B:
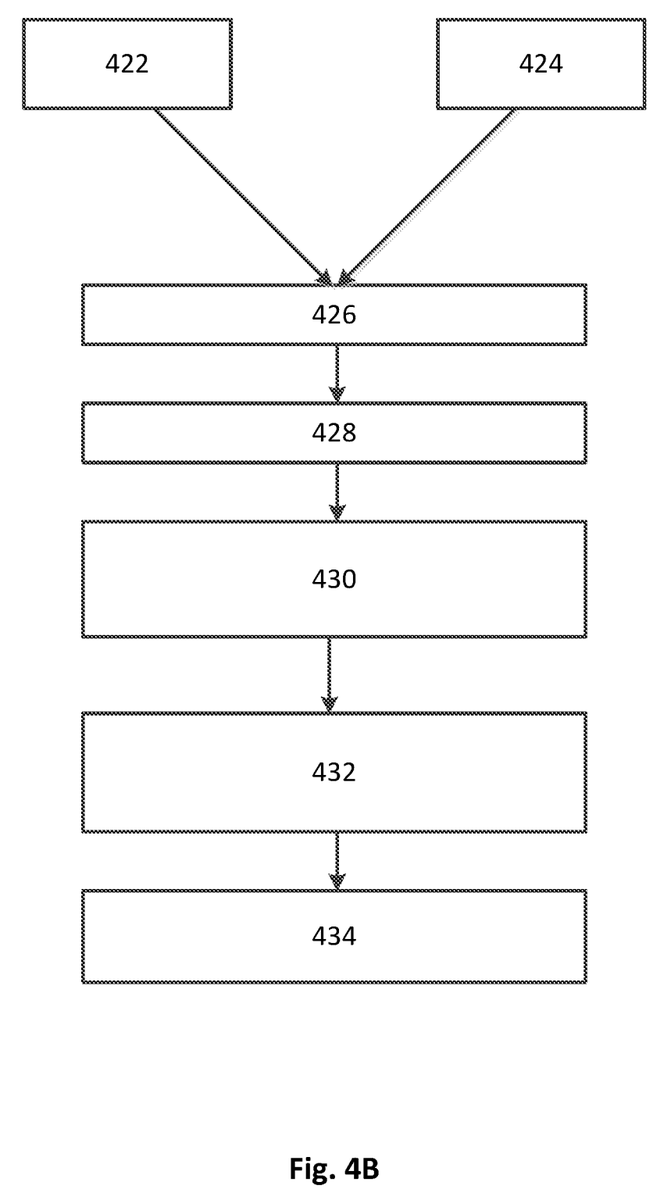

FIGS. 4A and 4B are schematic flow charts illustrating details of a line detection step.

As described with reference to FIG. 2, the method 200 comprises a line detection step 230 for detecting lines in the captured images from the camera. FIGS. 4A and 4B, which are to be viewed together, illustrate a possible procedure for implementing detection of one or more lines in an image. However, it is to be understood that other procedures, methods or algorithms for detecting lines in images are well known to the skilled person, and that other such procedures, methods or algorithms may alternatively be employed in the method 200, specifically in the line detection step 230 of the method 200.

FIG. 4A starts with the provision 410 of an image, e.g., a color image, corresponding to step 12 illustrated in FIG. 2.

In step 412, for each pixel in the image, a core area designated USAN, i.e., "Univalue Segment Assimilating Nucleus", is calculated.

Further, the center of gravity is calculated (step 414), and the covariance matrix (step 416) for the core area USAN is calculated, as well as the eigenvalue decomposition (step 418) of the resulting covariance matrix.

Subsequently, in step 420, the calculated features are compared, i.e., the result of the eigenvalue decomposition, with stored threshold values, and a score value is calculated which tells to what degree the pixel resembles a line.

Further, also in step 420, the angle of the line is calculated, specified by the direction of the eigenvector belonging to the maximal eigenvalue.

As a result, in step 422, a line-score-image appears, and, in step 424, a line-angle-image.

The procedure for line detection proceeds in FIG. 4B, which is based on step 422 for provision of the line-score-image and step 424 for provision of the line-angle-image, which is also shown in FIG. 4A.

In the procedure, a step 426 is performed to create a list of the pixels in the score-image which have a value above a specified threshold value. Moreover, in step 428, pixels of the list which have the same or substantially the same angle are grouped, and which are positioned at a certain density in the same line.

Subsequently, in step 430, e group score is calculated, based on the number of pixels and the individual line-score-values.

Finally, in step 432, the groups having a score above a specified threshold value are filtered out. These groups are considered detected lines in the image.

Thus, the detected lines, or the detected line, appear(s) in step 434.

Figure 5A:
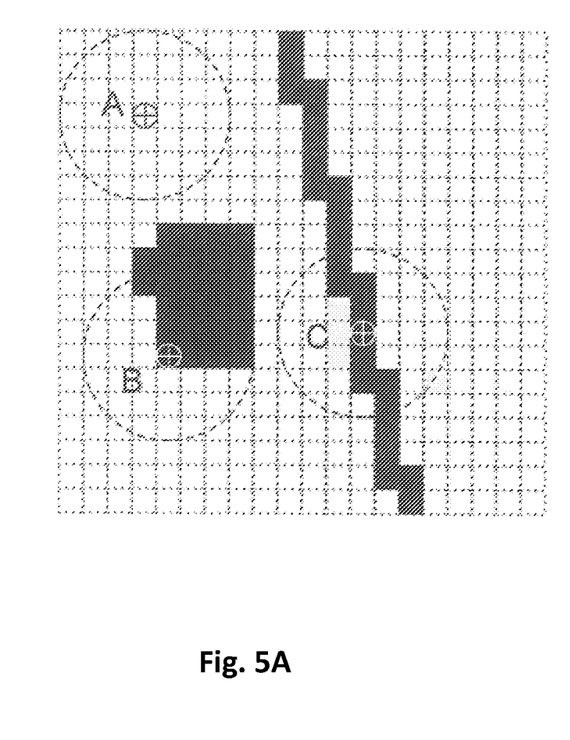
FIGS. 5A and 5B are schematic figures specifying further steps of the line detection step illustrated in FIGS. 4A and 4B.
Figure 5B:
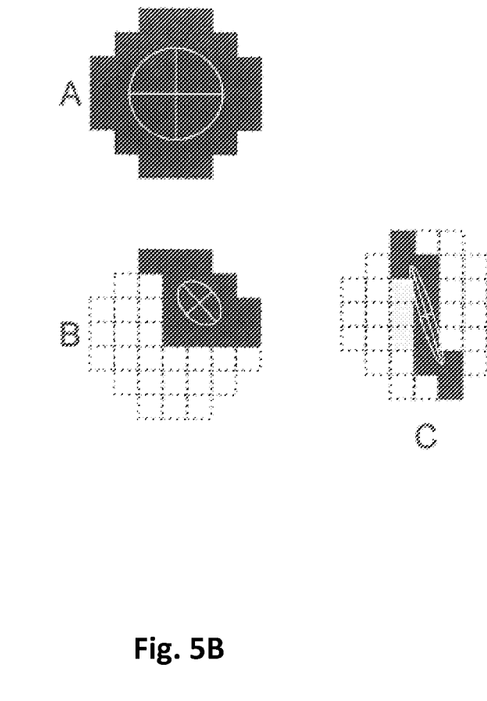

FIGS. 5A and 5B are schematic figures specifying further features of the line detection step illustrated in FIG. 4A and 4B.

In FIG. 5A it is illustrated an exemplary image section of 20×20 pixels, with three chosen, circular adjacent areas designated A, B, and C. The crosshairs indicate the center pixels of the adjacent areas. The task of the line detection step is to detect a line in the exemplary image section.

In FIG. 5B, black pixels illustrate a core area, i.e., a USAN area, for each of the three circular adjacent areas A, B, and C shown in FIG. 5A. The ellipses illustrated in FIG. 5B show the center of gravity (the center of the ellipse) of the USAN area and the dispersion direction. These are calculated by eigenvalue composition.

When the ellipse associated with the USAN area is sufficiently flattened, i.e., that the minor semi-axis of the ellipse is sufficiently small compared to the larger semi-axis of the ellipse, it is decided that the investigated group of pixels is detected as a line.

Consequently, in FIGS. 5A and 5B, the pixels of the circular adjacent areas around points A and B will not be detected as a line, while the pixels in the circular adjacent area around point C will be detected as a line.

It is to be understood that the detailed description is provided as examples, and that the scope of the invention is defined by the patent claims.

The invention claimed is:

1. A method for detecting an overhead cable from an aerial vessel, comprising:
    providing, from a camera arranged in said aerial vessel, a plurality of images of an area beneath said aerial vessel during motion of said aerial vessel, including providing, from said camera, a first and a second image at a first and a second point in time, respectively, while the aerial vessel is in motion between said first and second point in time;
    detecting lines in the first and second images;
    determining whether said lines represent lines at ground level or lines at a level above ground level; and
    determining whether a line at a level above ground level represents a possible overhead cable,
    wherein the step of determining whether said lines represent lines at ground level or lines at a level above ground level comprises:
        identifying pairs of lines belonging together, one, from said first image and one from said second image, respectively;
        identifying a background in each of said first and second images, associated with said pairs of lines; and
        determining if a particular line and background associated with said particular line have shifted more than a predetermined limit from said first to said second image, and, if so, determining if said particular line represents a line at a level above a ground level.

2. The method of claim 1, wherein the step of determining whether the lines represent lines at ground level or lines at a level above ground level comprises parallax calculation.

3. The method of claim 1, wherein the step of detecting lines in the first and second images comprises a modified SUSAN algorithm.

4. The method of claim 3, wherein the modified SUSAN algorithm comprises, for each of said images:
    providing a circular adjacent area around a center pixel,
    comparing the values of the center pixels with the values of other pixels within the adjacent area,
    defining a USAN area comprising the pixels in the adjacent area having values substantially similar to the center pixel,
    determining a geometry for the USAN area, and
    considering a line as detected when the geometry of the USAN area fulfils a predetermined requirement,
    determining a direction for the USAN area, and
    letting the direction of the USAN area determine the direction of the lines,
    the direction of the USAN area being determined by eigenvalue decomposition.

5. The method of claim 1, further comprising gathering position or motion data for the aerial vessel, and wherein the step of determining whether the line represents a line at ground level or a line at a level above ground level further employs said position or motion data.

6. The method of claim 1,
    wherein said plurality of images are color images, and
    wherein the step of detecting lines in the first and second images comprises assessing color of pixels in said first and second images.

7. The method of claim 1, performed during a landing preparing procedure for the aerial vessel.

8. The method of claim 1, wherein said camera is arranged in the aerial vessel in such a manner that the field of view of the camera is directed substantially perpendicular towards the ground.

9. The method of claim 1, further comprising issuing a warning when the overhead cable is detected.

10. The method of claim 1, performed by a processor device in a device for detecting the overhead cable from the aerial vessel.

11. Device for detecting the overhead cable from the aerial vessel, comprising the camera and a processing device, wherein said processing device is arranged to perform a method as defined in claim 1.

\* \* \* \* \*